United States Patent [19]

Wieser

[11] 4,193,584
[45] Mar. 18, 1980

[54] LIVESTOCK FENCE

[75] Inventor: Joseph H. Wieser, Maiden Rock, Wis.

[73] Assignee: Wieser's Concrete Products, Inc., Maiden Rock, Wis.

[21] Appl. No.: 930,405

[22] Filed: Aug. 2, 1978

[51] Int. Cl.² ............................................. E04H 17/14
[52] U.S. Cl. ..................... 256/19; 256/13.1; 256/24; 119/20
[58] Field of Search ........................ 256/19, 24, 25, 27, 256/13.1; 119/20

[56] References Cited

U.S. PATENT DOCUMENTS

| 984,711 | 2/1911 | Stanley | 256/19 |
|---|---|---|---|
| 1,247,107 | 11/1917 | Graham | 256/19 |
| 1,761,796 | 6/1930 | Mead | 256/19 |
| 2,745,638 | 5/1956 | O'Conner | 256/19 |
| 3,193,255 | 7/1965 | Burdett | 256/19 |
| 3,614,068 | 10/1971 | Koehl | 256/24 X |

FOREIGN PATENT DOCUMENTS 10696 12/1933 Australia ...................................... 256/19

Primary Examiner—Andrew V. Kundrat
Attorney, Agent, or Firm—Merchant, Gould, Smith, Edell, Welter & Schmidt

[57] ABSTRACT

An improved livestock fence comprises a plurality of concrete posts which receive therebetween a plurality of concrete panels. Each of the posts has an enlarged base to allow the post to be free standing. Each panel is held between two adjacent posts with opposite sides of the panel being received in vertical slots in the posts. The weight of the panel is borne substantially by the ground rather than the posts. In addition, a securing strap loosely surrounds each post and has the ends thereof affixed to the face of the panels for keeping the panels longitudinally located in the slots of the posts.

10 Claims, 8 Drawing Figures

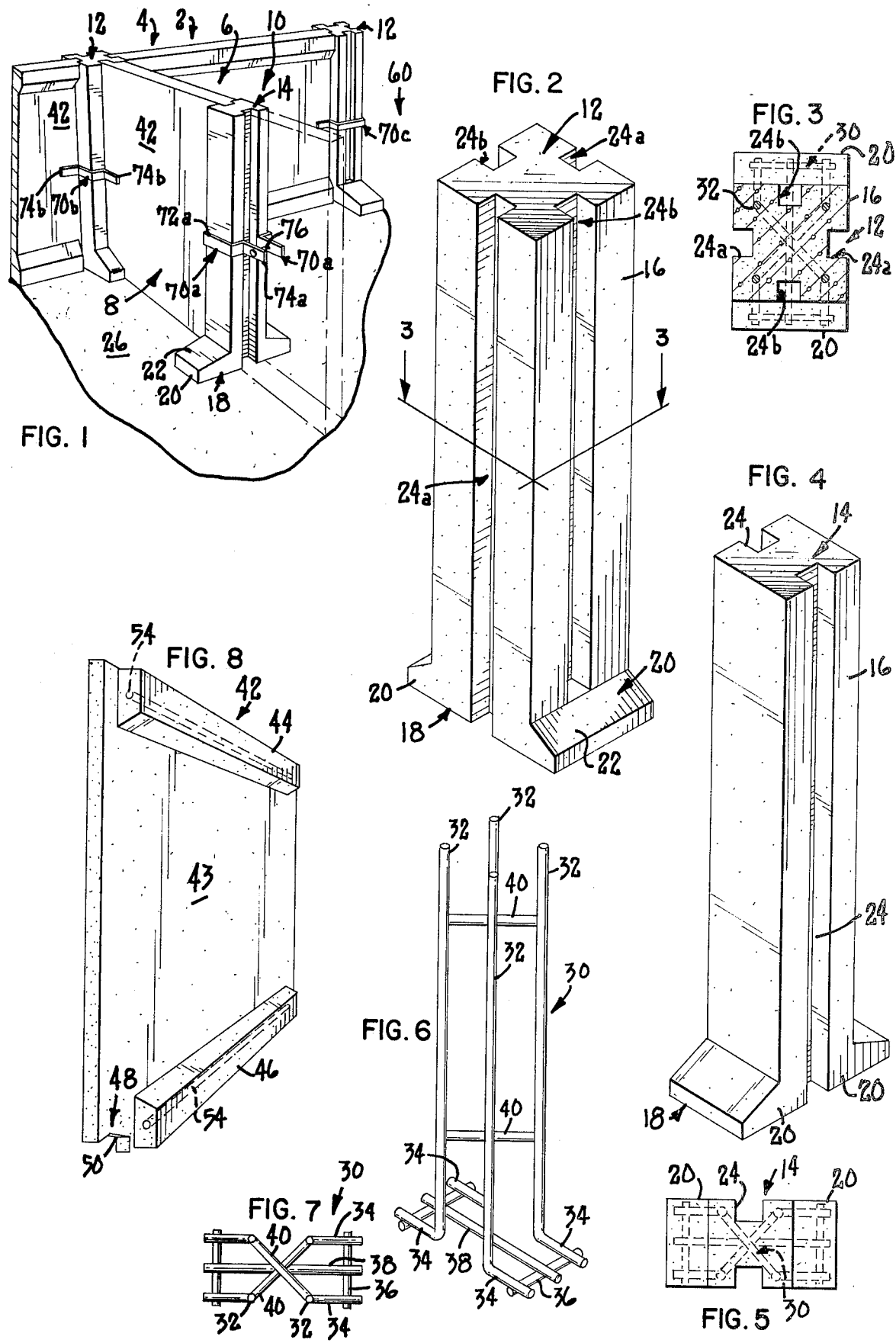

LIVESTOCK FENCE

BACKGROUND OF THE INVENTION

1. Field of the Invention

This invention relates to an improved fence for containing livestock or the like. More particularly, the fence according to this invention is formed from concrete or similar stone-like materials.

2. Description of the Prior Art

It is well known that livestock must often be confined in suitable pens, corrals, or the like. Hogs are one type of animal which can have a very deleterious effect on the fencing comprising the pens. For example, when hogs are kept in tight confinement, they have a tendency to eat almost everything. It has been found that such hogs will often eat wood when kept tightly confined. Thus, wood is an inappropriate material for use in the fences or pens in which the hogs are confined since the hogs will often eat their way through the fence or damage it at the very least. Similarly, steel and other metals are not a suitable fencing material for hogs. This is so because steel is susceptible to being corroded by the acids contained in the waste materials of the hogs.

Concrete is one type of material which has been proposed for use in hog fences. Concrete is an advantageous material for such a purpose as it can't be eaten by the hogs and is generally resistant to degradation by the acids in the waste of the hogs. One type of concrete hog fence previously used has been one in which the walls of the fence have been simply poured-in situ, i.e. the concrete is placed in its "wet" form in a configuration corresponding to the desired fence and then is allowed to dry or cure. Such poured-in-situ pens, although effective for containing the hogs, do not have a great deal of versatility. In other words, poured-in-situ pens inherently have only one configuration corresponding to that configuration in which the walls of the pen were initially poured. If the farmer should have need of a different pen configuration or a pen located on a different site, then a totally new poured-in-situ pen must be formed. This is an expensive and undesirable procedure.

Certain livestock fences have been made from pre-cast concrete components, i.e. pre-cast posts and panels, rather than comprising poured-in-situ walls. Such pre-cast fences are of the type shown in U.S. Pat. No. 3,614,068 to Koehl, U.S. Pat. No. 2,745,638 to O'Connor, and Australian Patent No. 10,696 to Cloughton. However, the prefabricated fences proposed in these patents also have a number of disadvantages. For example, some of these patents disclose that the posts of the fence must be embedded in the ground. This is undesirable since it necessarily involves the digging of post holes and the insertion of the posts into the holes. This increases the amount of labor needed to erect or to dismantle the fence. In addition, since the posts are embedded in the ground which requires a considerable amount of effort to dismantle the fence and re-erect it at a different location, the farmer is discouraged from changing the location of the fence once it is first established. Thus, the versatility which would otherwise have been exhibited by the fence is somewhat diluted because of the necessity to embed the posts.

The patent to Koehl discloses the use of a hog fence having pre-cast concrete posts which are free-standing rather than being embedded in the ground. A plurality of concrete panels or rail assembly members are received between adjacent posts. Koehl discloses that the concrete panels should be secured to the posts by means of L-shaped mounting brackets. These brackets transfer the weight of the panels to the posts which further enables the posts to be free-standing. However, the panels must be lifted up off the ground to attach them to the posts which may be a difficult operation if the panels are heavy. In addition, when the panels are heavy and must be lifted, they must also be held off the ground while the brackets on the posts and the panels are aligned and the securing members, such as bolts, connected therethrough. These operations of lifting and aligning the panels and posts may be quite difficult to accomplish and would probably require that a number of people be available to help erect the fence. Thus, while Koehl discloses a pre-cast fence in which the posts are not embedded, the fence of Koehl may be difficult to assemble.

SUMMARY OF THE INVENTION

One aspect of this invention is the provision of an improved concrete fence for hogs or similar livestock.

The improved fence of this invention comprises a plurality of free-standing posts having an enlarged base. A plurality of pre-cast concrete panels are received between any two spaced posts. The posts and the panels have an interfitting slot and lip connection or attachment to laterally confine the panels between the posts. However, the slot and lip connection is so shaped such that the weight of the panels is borne substantially on the ground and not the posts. In addition, the fence of the present invention includes a securing strap secured between adjacent panels of the fence to keep these panels from moving longitudinally relative to the posts. The straps insure that movement of the animals confined by the fence will not disengage the panels from the posts.

BRIEF DESCRIPTION OF THE DRAWINGS

FIG. 1 is a perspective view of a section of an improved fence according to this invention, illustrating the components of the fence orientation;

FIG. 2 is a perspective view of a sectional or corner post used in the fence of FIG. 1;

FIG. 3 is a cross-sectional view of the sectional post of FIG. 2, taken along lines 3—3 of FIG. 2;

FIG. 4 is a perspective view of an intermediate post used in the fence of FIG. 1;

FIG. 5 is a top plan view of the post shown in FIG. 4;

FIG. 6 is a perspective view of a reinforcement member for the posts of FIGS. 2-5;

FIG. 7 is a top plan view of the reinforcement member shown in FIG. 6; and

FIG. 8 is a perspective view of one of the concrete panels used in the fence of FIG. 1.

DETAILED DESCRIPTION

Referring first to FIG. 1, an improved fence for containing livestock, e.g. preferably hogs and pigs, is indicated generally as 2. Although fence 2 is preferably used and eminently suited for containing livestock, the fence as disclosed herein could also be used for other purposes if so desired. For example, fence 2 could be used to serve as a divider or marker along a property line. Similarly, fence 2 can be put to any other use for which fences are normally employed.

In keeping with the primary purpose of enclosing or containing livestock, fence 2 as disclosed herein is preferably formed to make a complete enclosure. In other words, fence 2 can have the components thereof formed in any suitable shape as long as there is no opening or gap in the fence not closed by a gate. For example, fence 2 could be formed to define an enclosed rectangular or circular corral. Although the components of fence 2 as described herein can be used to form all the needed sides of the enclosure, this is not necessary where an existing structure is available to form one or more of the sides. For example, fence 2 as disclosed herein could be used to abut against a conventional hog shed or the like. In such an event, the hog shed would form one of the sides of the enclosure and the fence 2 could form the remaining sides of the enclosure. In addition to forming the exterior outline of the enclosure, the components of fence 2 described herein can further be used to subdivide the enclosure into separate pens or stalls. For example, referring to FIG. 1, the components of fence 2 are shown forming an exterior wall 4 and an interior wall 6. Exterior wall 4 forms the outside wall of the enclosure and the interior wall 6 subdivides the enclosure into separate pens 8 and 10.

An important feature of fence 2 according to this invention is to provide a fence which can be easily and quickly set up to any desired configuration. It is a further feature that the components comprising fence 2 can also be quickly dismantled if the configuration of the fence is to be changed or if the fence is to be dismantled at one location and moved to another location where it is to be reassembled. In keeping with these features, fence 2 according to the present invention is made of a plurality of prefabricated components which can be individually manufactured and shipped in an unassembled form, but which can collectively be associated together to form a completed fence. Preferably, it is an aspect of this invention that the components of fence 2 be formed of concrete or similar hard stone-like materials having a relatively high density. Such materials are preferred when fence 2 is to be used for containing livestock and especially hogs because concrete is largely impervious to the acid and other substances in the waste droppings of the animals which degrade or corrode many other materials. In addition, hogs are not able to eat or otherwise disentegrate concrete.

Fence 2 comprises a plurality of prefabricated posts which are generally indicated as 12 and 14 in FIG. 1. Posts 12 and 14 are generally similar except for a few differences to be enumerated hereafter. Posts 12 and 14 each comprise a vertically extending rectangular upright or column 16. Upright 16 has an enlarged base 18 at the bottom thereof. Base 18 includes two rectangular support flanges or feet 20. Feet 20 extend laterally from two opposite sides of the column 18 and have tapered top surfaces 22. As seen in FIGS. 2-4, the feet 20 do not extend from all four sides of the column 16, but preferably only from two opposed sides.

Posts 12 and 14 are generally identically shaped and have the same height. However, the differences between the posts 12 and 14 are these: (1) the column 16 and the base 18 of the post 12 are generally larger than the corresponding elements of the post 14; and (2) there is a difference in the placement and number of certain vertically extending slots or grooves generally indicated as 24 in the posts. With regard to the former difference, the column 16 of the post 12 preferably comprises an eight inch square whereas the corresponding area of the column 16 of the post 14 comprises a six inch square. Feet 20 can be identically sized on the posts 12 and 14. However, feet 20 must have a sufficient area to allow the posts 12 or 14 to be completely free-standing on top of the ground. The ground or a typical support surface for the posts 12 and 14 is generally indicated as 26 in FIG. 1.

As shown in FIGS. 2 and 4, both the posts 12 and 14 have vertical slots or grooves 24 located in one or more sides of the posts. Vertical slots 24 in the post 14 extend down two opposed sides of the post all the way from the top to the bottom of the post. The slots 24 are in those sides of the post 14 which do not have the feet 20 at the bottom thereof. Slots 24 in posts 14 are 180° offset from one another. Post 12 has four vertical slots 24 located in each of the sides thereof. Two of these slots, i.e. slots 24a, are located in those sides of the post 12 not taken up by the feet 20 and extend from the top to the bottom of the post 12. In this regard, slots 24a are identical to slots 24 in post 14. However, the other two slots, i.e. slots 24b, extend through the two remaining sides of the post 12. Although slots 24b extend all the way to the top of the post 12, they terminate short of the bottom of post 12 at a position generally adjacent the inner end of foot 20. Thus, the slots 24a and 24b are offset at 90° relative to one another around the periphery of the post 12.

Both posts 12 and 14 are preferably pre-cast out of conventional concrete materials. Referring now to FIGS. 6 and 7, each of these posts also has an internal reinforcing means or member generally indicated as 30. Reinforcing means 30 comprises a suitable array of steel reinforcing rods or the like which are integrally welded to approximate the shape of the posts 12 and 14. For example, reinforcing member 30 as shown in FIG. 6 comprises four upwardly extending steel rods 32 having bent horizontal flanges 34 at the bottom thereof. Steel rods 32 are rectangularly arranged to approximate the rectangular shape of columns 16 of the posts. Flanges 34 are integrally welded to other horizontal reinforcing rods 36 and 38 to approximate the shape of the base 18. In addition, the vertically extending rods 18 are themselves reinforced by cross rods 40 which extend between any two opposed rods 18 at different elevations. As shown in FIGS. 6 and 7, only a single configuration or shape of the reinforcing member 30 is needed for either of the posts 12 or 14. In this regard, the reinforcing rods 32 are arranged such that they can be received within the six inch square column 16 of post 14. Inherently, the same configuration of rods 32 could also be received inside the larger eight inch square column 16 of post 12. In any event, posts 12 and 14 are formed by placing the reinforcing member 30 in a suitable form or mold and then pouring in concrete material into the form. The form is shaped such that the grooves 24 and the feet 20 will be formed as the concrete cures.

As shown in FIG. 1, the posts 12 with their four-way groove or slot arrangement comprise a sectional or corner type of post. The posts 14 with their two-way slot arrangement comprises an intermediate post. The posts 12 and 14 are adapted to be spaced apart in any given desired configuration. Substantially solid pre-cast concrete panels, generally indicated as 42, are designed to be received between any two adjacent posts 12 or 14. Because of its four-way slot arrangement, the posts 12 can accept panels 42 at 90 degree increments and thus form corners in fence 2. However, the posts 14 can only form part of a straight wall of the fence 2 since the slots 24 therein are 180 degrees apart.

Referring now to FIG. 8, each of the panels 42 comprises a substantially planar main panel body 43. Panel body 43 has top and bottom reinforcing ribs 44 and 46 formed integrally therewith. Reinforcing ribs 44 and 46 run substantially the entire length of the panel 42 except for a small distance adjacent either side of the panel. A notch 48 is provided in this distance at each side of the panel adjacent the bottom reinforcing rib 46. Notch 48 is formed to have a slanted top surface 50 generally corresponding to the slanted top surface 22 of feet 20. Notches 18 are provided in the panels 42 to enable the panels to be received in the grooves 24b. However, notches 48 are sufficiently dimensioned such that when the panels are received in grooves 24b none of the main panel body 43 contacts any portion of the posts in a weight transferring relationship. Panels 42 can be formed in any convenient manner and further can have internal reinforcing means provided therewith. For example, the reinforcing ribs 44 and 46, which reinforce the substantially planar main panel body 43, can each have longitudinally extending reinforcing bars 54 therein.

To use the fence 2 according to this invention, the posts 12 and 14 are first arranged in any desired manner to correspond to the configuration of a desired enclosure. For example, as shown in FIG. 1, corner post 12 can be part of the outside wall 4 of the enclosure with that wall being continued by any suitable combination of posts 12 and 14 as necessary. Some of the posts 12 can define an opening generally indicated as 60 for the enclosure. Opening 60 would normally be closed by some kind of gate (not shown). Any suitable number or arrangement of interior pens or stalls 8 and 10 can also be formed. As shown in FIG. 1, the post 14 is in the process of dividing the enclosure into interior pens.

In assembling fence 2, the posts 12 and 14 are first located in any desired manner. Posts 12 and 14 are freestanding on top of ground 26 because of their weight and the breadth of feet 20. Once a first post 12 or 14 is in place, one panel 42 can then be longitudinally slid relative to the post until one side thereof is received in one of the slots 24. In this regard, each side of the panel 42 has a reduced thickness compared to the combined thickness of main panel body 43 and the reinforcing ribs 44 or 46. Obviously, if each side of panel 42 had the entire thickness thereof defined by the combined thickness of panel body 43 and the ribs 44 or 46, the size of the groove 24 would necessarily have to be enlarged. This might cause some columns 16 to fracture along the corners between adjacent grooves 24. However, by reducing the thickness of the panel sides, the thickness of the grooves 24 can also be reduced, thereby alleviating the problem of having the columns 16 fracture along the corners thereof. Each side of the panel 42 thus defines a reduced thickness lip which can be received in one of the grooves 24 on one of the posts 12 or 14.

Once a panel 12 is slid into one of the slots 24 on a first post 12 or 14, an opposed post 12 or 14 is slid up to abut against the other side of the panel 42 with that side then being received in one of the slots in the second post. Once the two posts 12 or 14 and panel 42 have been so emplaced, slots 24 serve as a means for laterally confining the panels 42 between the posts. However, the notch 48 in the lower panels 42 is so configured that the panels 42 do not have any of their weight transferred to the posts. Rather, the notches 48 are cut away so that although the side of the panels 42 is received in the slots 24, that side does not in any way abut against the bottom of slots 24b. Because the other slots 24 and 24a go all the way to the bottom of the posts, there can also be no way that the panels 42 received in these slots would transfer their weight to the posts. Thus, the weight of the posts is borne substantially by the ground and none of it is transferred to the posts. Posts 12 and 14 serve as a means for laterally confining the panels therebetween.

In addition, fence 2 comprises means for loosely securing the panels against longitudinal movement relative to the posts. These means include straps generally designated as 70 and having a number of different forms 70a-70c. Straps 70 generally have an inner configuration 72 which is meant to be loosely received around either of the posts 12 or 14 with outwardly extending flanges 74 thereon. For example, the straps 70a shown surrounding post 14 have a substantially U-shaped middle portion 72a and two outwardly extending flanges 74a which are parallel to one another. Two opposed straps 70a are used around post 6 with one strap adjacent each face of the panel 42. These straps 70a are secured to the panels by means of bolts 76 or the like passing through the flanges 74a and the faces of the panels 42. Only one flange 74a of each strap 70a is shown in FIG. 1. Similarly, the strap 70b shown around one post 12 in FIG. 1 has a configuration which would correspond with that needed for a corner post adjoining perpendicular panels 42. Strap 70b has the flanges 74b positioned at right angles relative to one another in a manner corresponding to the perpendicular orientation of the panels 42. In addition, straps 70c can be used for encircling a corner post 4 which forms the post adjacent a gate opening 60. In such a strap, the flanges 74c would be parallel to one another and be located respectively on each opposed face of the same panel 42, i.e. the panel adjoining the post 12.

The purpose of the straps 70 is merely to secure the panels 42 against longitudinal movement relative to the posts 12 or 14. It has been found that when hogs are bunched into pens or the like, the hogs will often jostle against the panels 42 and the posts 12 and 14. Although the hogs are usually not able to knock the panels and posts over, they sometimes have been able to separate the panels from the bottom of the posts and cause a gap thereat. Straps 70 prevent such a gap. Furthermore, the straps 70 are preferably located adjacent the midpoint of the panels 42 between the top and bottom ends of the posts 12 and 14. This is the most efficient placement for preventing longitudinal movement of the panels relative to the posts. For example, although the straps 70 could be positioned across the top surface of the posts and panels, hogs might still be able to cause a small gap at the bottom of the posts. However, placing the straps 70 at the midpoint of the panels prevents this gap.

Fence 2 according to this invention is quickly and easily installed. Because the posts 12 and 14 are completely free-standing, there is no need for these posts to be embedded or otherwise placed beneath ground level. Posts 12 and 14 can be made free-standing quite easily because none of the weight of the panels 42 is borne by the posts. The weight of the panels is borne substantially and entirely by the ground. Thus, the posts 12 and 14 can be somewhat lighter and thus easier to move than they would have to be in the case where the weight of the panels would have to be carried by the posts. However, the panels are adequately secured relative to the posts by means of the straps 70 which bridge around the panels from the face of one panel to the face of an adjacent panel or to the opposite face of the same panel. Furthermore, straps 70 as disclosed herein are quickly and easily installed by bolts 76 on the face of the panels 42.

Preferably, the posts 14 have a weight of approximately 130 pounds and the posts 12 have a weight of approximately 186 pounds. The posts and the panels are preferably about 42 inches high although this height could increase. However, if the fence 2 is made higher, the base 18 for the posts 12 and 14 will also correspondingly be made larger in order that the posts be free-standing. The panels 42 have a weight of approximately 75 pounds per linear foot. While it would be possible to manually emplace the posts 12 and 14, panels 42 if they have a large length would be quite heavy. This would require that such panels be moved about and emplaced with the aid of a mechanical device, such as a winch or a hydraulic boom on a tractor or the like. Panels 42 can obviously be made to any length which is desired although it is contemplated that such panels might have one standard length.

Various modifications of this invention will be apparent to those skilled in the art. For example, it is preferred that the panels 42 have a substantially solid main panel body 43 rather than having a plurality of spaced slats or the like. Such a solid panel body discourages the animals being confined by the fence from climbing up the sides of the fence. However, a slatted concrete panel 42 could be used if so desired. Thus, the scope of this invention is to be limited only by the appended claims.

What is claimed is:

1. An improved fence for containing livestock, which comprises:
    (a) a plurality of spaced pre-cast concrete posts, wherein each post includes an enlarged base of sufficient size such that the posts are suited to be free-standing on top of the ground;
    (b) a plurality of pre-cast concrete panels, wherein each panel is suited to be received between any two adjacent posts;
    (c) means for confining each panel between the two adjacent posts such that the panel is held against lateral movement and the weight of the panel is not transferred to the posts but is substantially borne by the ground; and
    (d) means for securing each of the panels against longitudinal movement relative to the posts such that the panels are held confined between the posts to maintain the integrity of the fence, wherein the securing means comprises a strap loosely surrounding each post and having the ends thereof affixed to a face of the panels adjacent the posts.

2. An improved fence, which comprises:
    (a) a plurality of spaced, free-standing posts arranged in an array corresponding to an outline of the fence;
    (b) a plurality of pre-fabricated panels each of which is received between any two adjacent posts, the panels being made of substantially dense stone-like material;
    (c) wherein each of the posts has a vertical slot provided in one or more of the sides thereof, the slots being shaped to receive therein the sides of the panels in such a manner that the panels are laterally confined between the adjacent posts and the weight of the panels is transferred substantially entirely to the ground; and
    (d) further including securing means to prevent the panels from moving longitudinally relative to the posts, wherein the securing means comprises a strap loosely surrounding each post and having the ends thereof affixed to a face of the panels adjacent the post.

3. An improved fence as recited in claim 2, wherein the strap is located approximately at the midpoint between a top and bottom edge of the posts and the panels.

4. An improved fence as recited in claim 2, in which both the posts and the panels are pre-cast from concrete material.

5. An improved fence as recited in claim 2, in which some of the posts are of a first type having two vertically extending slots in the sides thereof, the slots being 180° offset relative to one another.

6. An improved fence as recited according to claim 5, in which some of the posts are of a second type having four vertically extending grooves in the sides of the post, the slots being offset at approximately 90° relative to one another.

7. An improved fence as recited in claim 2, in which the sides of the panels received in the slots in the posts have a reduced thickness to decrease the necessary thickness of the slot.

8. An improved fence as recited in claim 2, in which each panel comprises a substantially solid and planar main panel body having a height corresponding to the height of the posts.

9. A kit having component parts suitable for being assembled in the field to provide a livestock fence, the kit comprising the combination of:
    (a) a plurality of pre-cast concrete posts having an enlarged base of sufficient breadth and having sufficient weight such that the posts can be free-standing on top of a ground surface, the posts being positionable in a spaced apart array corresponding to an outline of a desired fence configuration, and wherein each of the posts further has at least one vertical slot therein;
    (b) a plurality of pre-cast concrete panels, each panel having opposed sides thereof shaped to be received in the slots in the posts such that the panels are positionable between two adjacent posts with the sides of the panels being laterally confined in the slots thereof; and
    (c) a plurality of securing straps, each securing strap having a middle portion for loosely surrounding the posts and opposed outer end portions which are connectable to the face of the panels, the securing straps being secured to the face of the panels for holding the panels against longitudinal movement relative to the posts.

10. A kit according to claim 9, in which the posts comprise:
    (a) a plurality of corner posts having four vertical slots therein spaced at approximately 90° relative to one another, each of the slots being suited for receiving the sides of the panels, and
    (b) a plurality of intermediate posts each of which has two slots therein spaced at approximately 180° relative to one another, each of the slots being suited for receiving the sides of the panels.

* * * * *